June 26, 1934.  H. M. ROCKWELL  1,964,082
INTERNAL COMBUSTION ENGINE
Filed Oct. 18, 1929  5 Sheets-Sheet 1
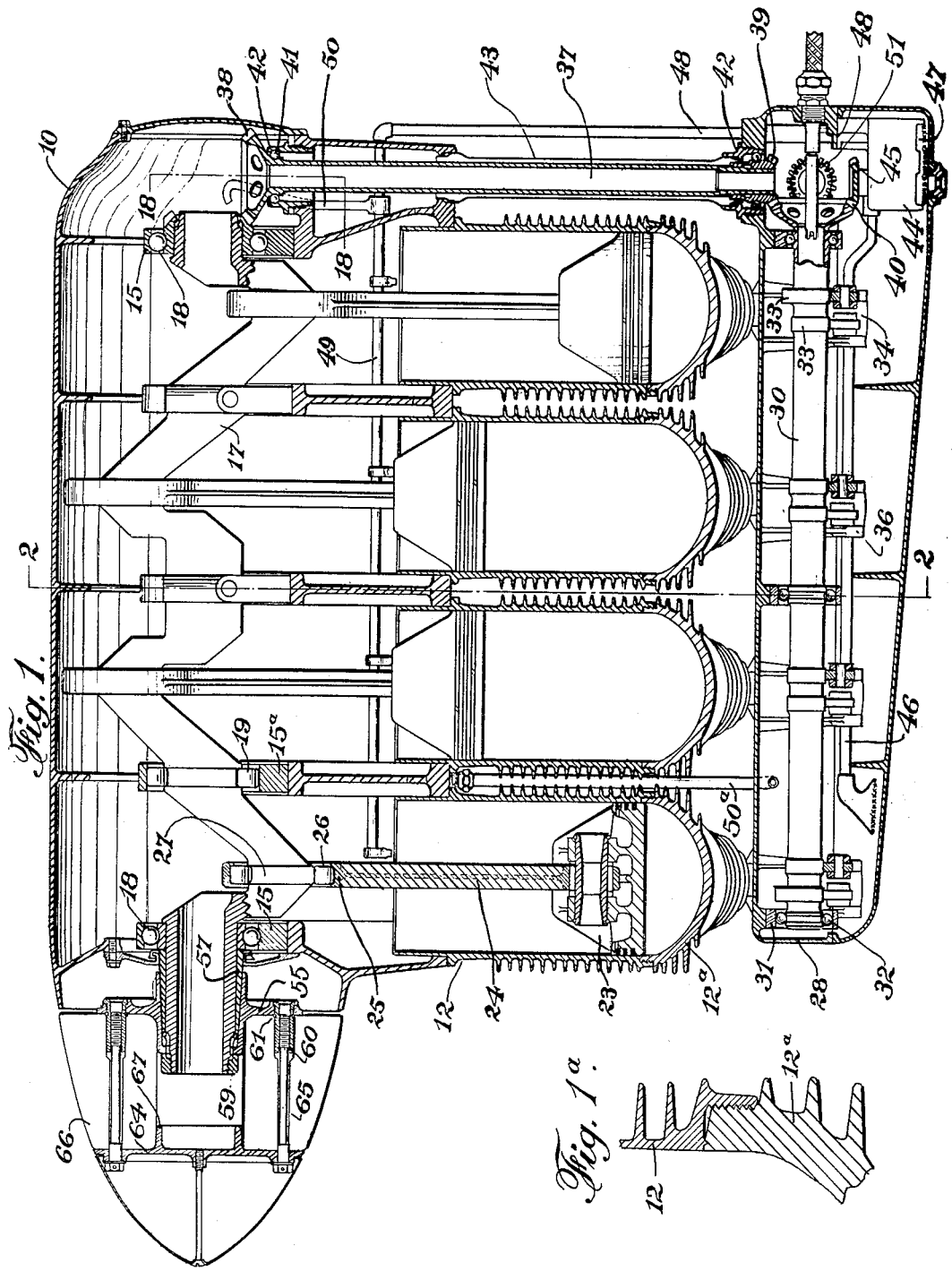
INVENTOR
HUGH M. ROCKWELL
BY
Kenyon & Kenyon
ATTORNEYS.

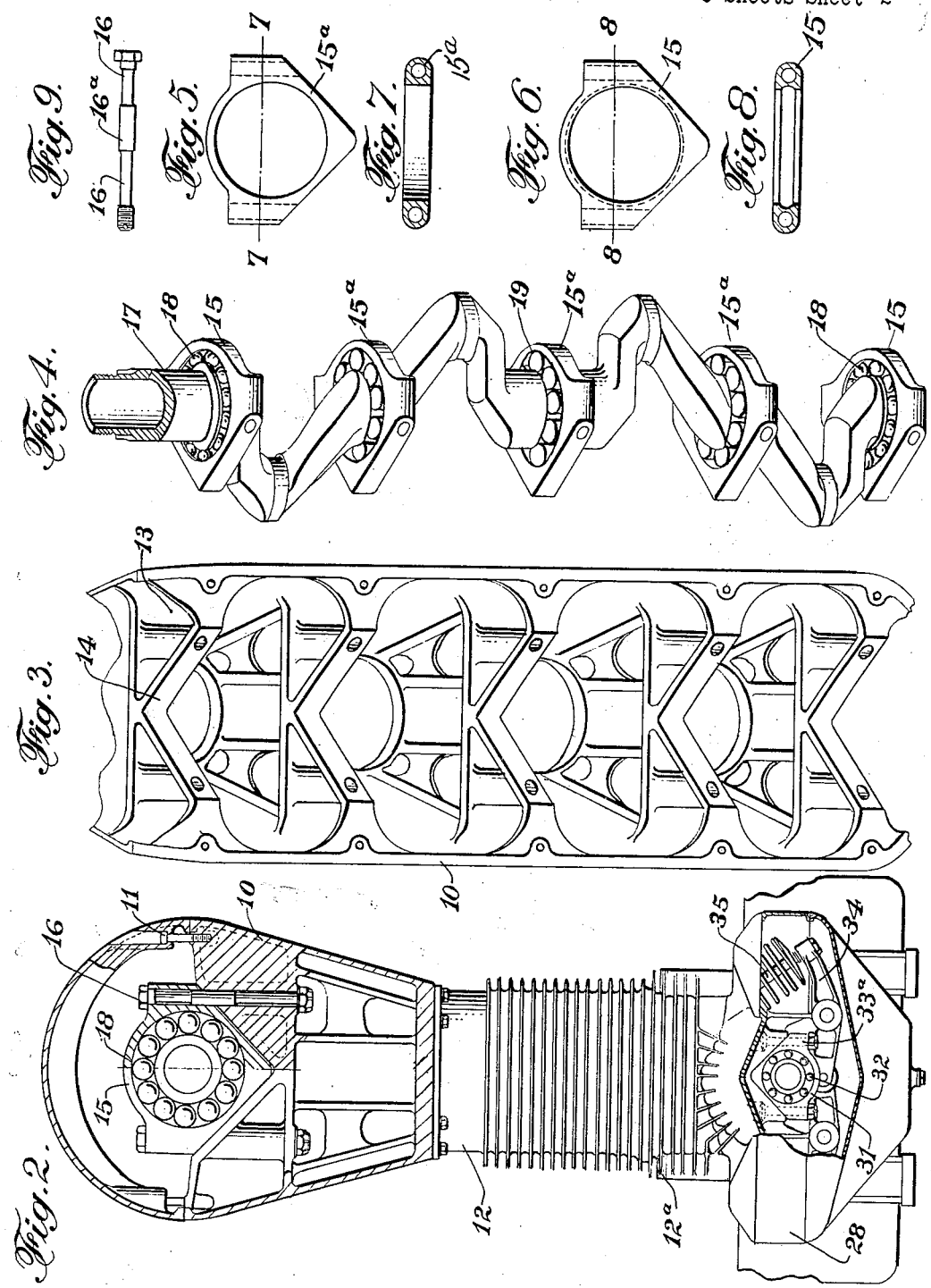

June 26, 1934.  H. M. ROCKWELL  1,964,082
INTERNAL COMBUSTION ENGINE
Filed Oct. 18, 1929   5 Sheets-Sheet 3
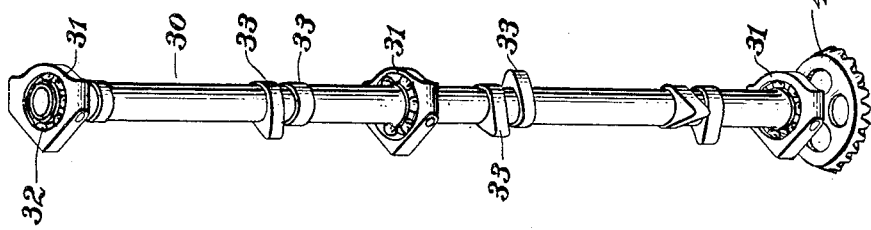
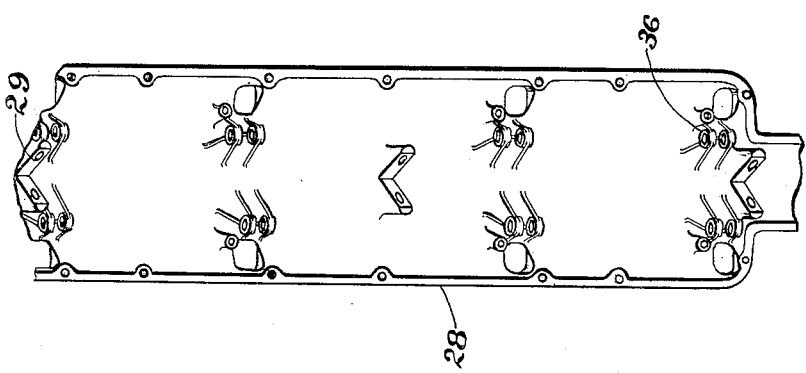
INVENTOR
HUGH M. ROCKWELL
BY
Kenyon & Kenyon
ATTORNEYS

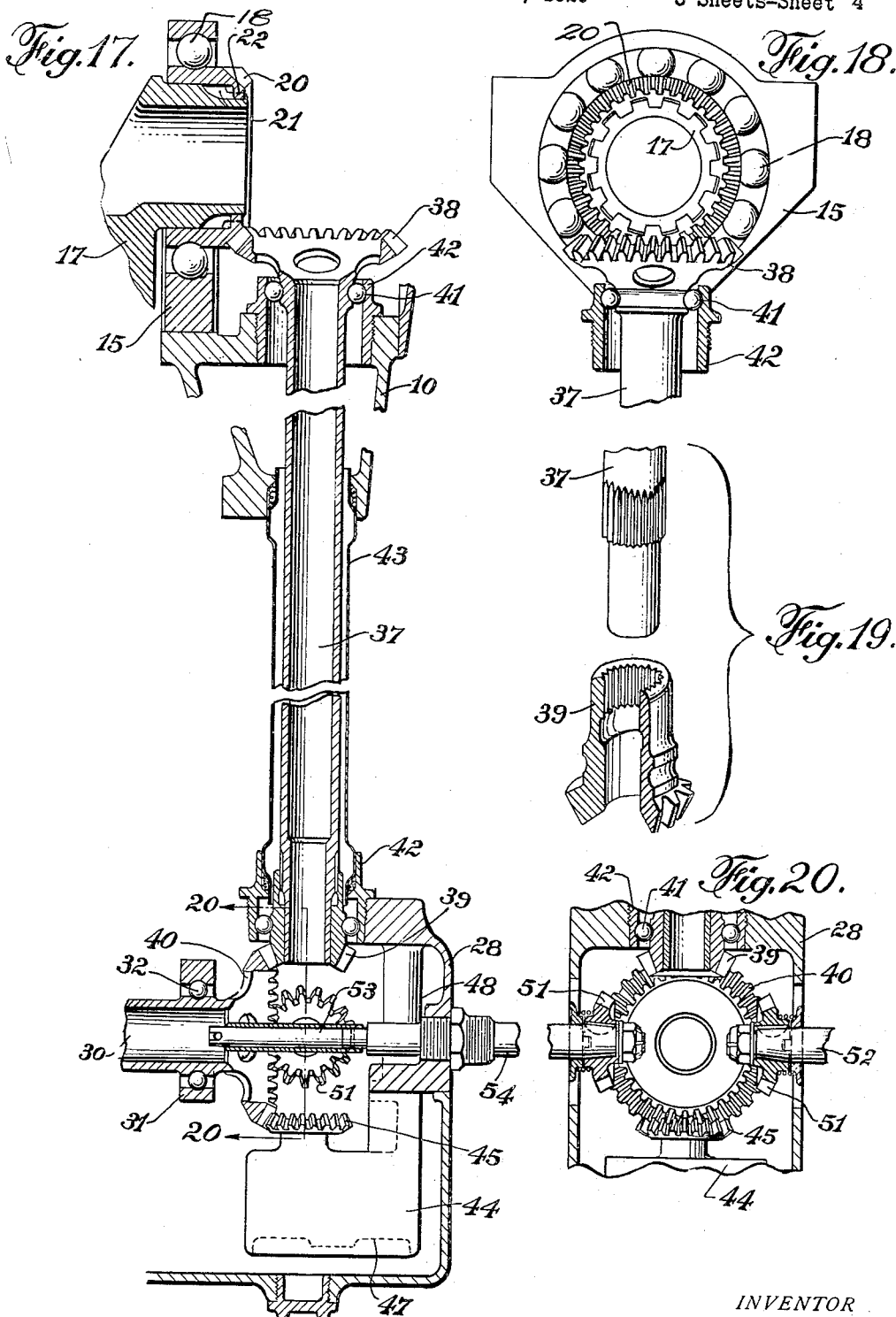

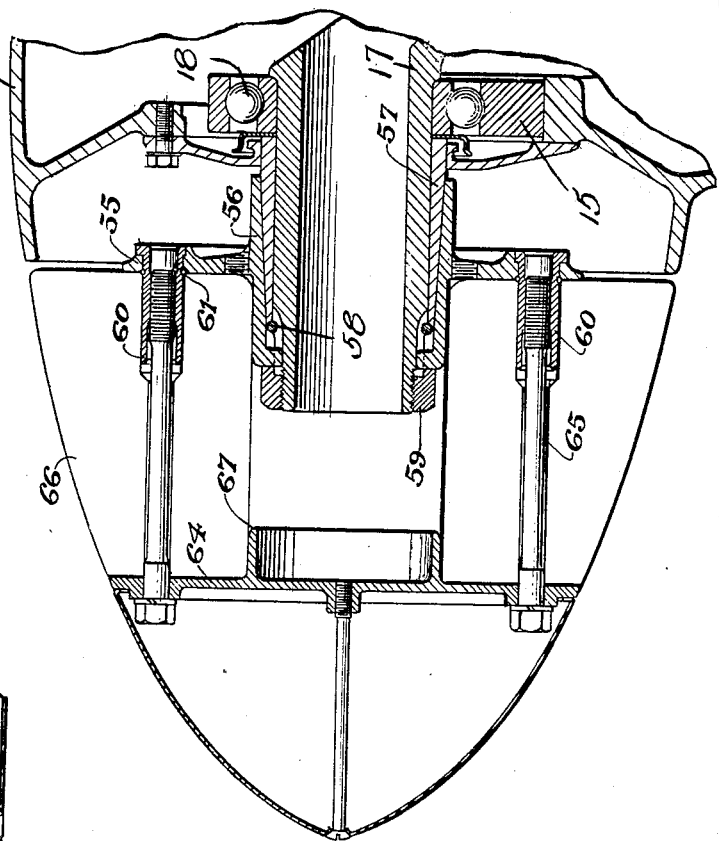
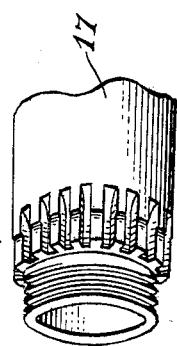
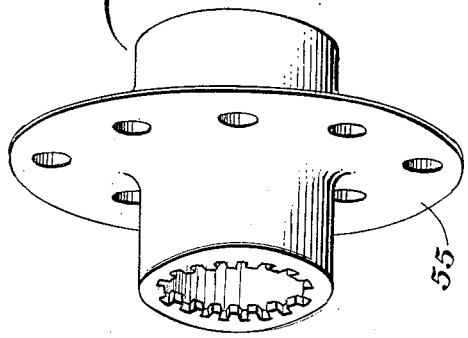
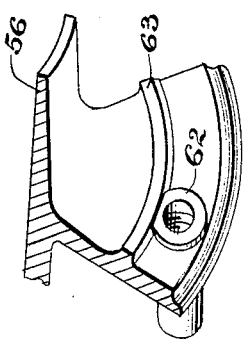
INVENTOR
HUGH M. ROCKWELL
BY
Kenyon & Kenyon
ATTORNEYS.

Patented June 26, 1934

1,964,082

UNITED STATES PATENT OFFICE 1,964,082

INTERNAL COMBUSTION ENGINE

Hugh M. Rockwell, Freeport, N. Y.

Application October 18, 1929, Serial No. 400,485

6 Claims. (Cl. 121—194)

This invention relates to internal combustion engines and has for an object a light-weight highly efficient airplane engine of the cylinder-in-line type.

In an engine embodying the invention, the cylinders are arranged below the crank shaft, thus clearing the space between the cockpit of the airplane and the propeller so that the pilot may have clear vision and the center of gravity is low. The propeller is carried by one end of the crank shaft and its hub and clamping cap are made substantially stream line, thus cutting down air resistance. The cam shaft is arranged below the cylinders and a drive shaft connects the cam shaft and crank shaft. The crank shaft has one end slidably mounted in a gear which meshes with a gear carried by the drive shaft, thus allowing expansion and contraction of the crank shaft without affecting the gears. The drive shaft is also provided with a beveled gear which meshes with a beveled gear carried by the cam shaft and the beveled gear on the drive shaft is adjustably connected thereto in such a way that a very fine degree of adjustment is afforded.

The crank shaft and the cam shaft are both mounted in anti-friction bearings which are provided with V-shaped portions fitting into a V-shaped recess formed in the engine casing. The V-shaped recesses or seats in the casing are milled in one setting on a milling machine with a formed cutter which insures perfect alinement. The V surfaces on the bearings are finished by clamping all of the bearings for a crank shaft assembly on an arbor which has a centering fit with the bores of the outer bearing races. The two V surfaces are then ground in the same setting on the arbor, thereby insuring surfaces which fit accurately in the recesses. This arrangement reduces the weight of the bearings as it eliminates the ordinary cap. Also the bearings are held securely against one part of the crank case and the possibility of the bearings becoming loose due to unequal expansion and contraction is avoided.

Other objects, novel features and advantages of this invention will become apparent from the following description and accompanying drawings, wherein:

Fig. 1 is a vertical section through an engine embodying the invention.

Fig. 1a is an enlarged fragmentary section.

Fig. 2 is a section on the line 2—2 of Fig. 1.

Fig. 3 is a perspective view of the bottom of the crank case.

Fig. 4 is a perspective view of the crank shaft and bearings.

Figs. 5 and 6 are elevations of the outer race members of the bearings.

Figs. 7 and 8 are sections on the lines 7—7 and 8—8 of Figs. 5 and 6 respectively.

Fig. 9 is a view of a bolt used to hold the outer race members in the crank case.

Fig. 10 is a perspective view of the top plate of the cam shaft housing.

Fig. 11 is a perspective view of the cam shaft and bearings.

Figs. 12 and 13 are elevations of the outer race members of the cam shaft bearings.

Figs. 14 and 15 are sections on the lines 14—14 and 15—15 of Figs. 12 and 13 respectively.

Fig. 16 is a detail of a clamping member.

Fig. 17 is an enlarged fragmentary section corresponding generally to Fig. 1.

Fig. 18 is a fragmentary section on the line 18—18 of Fig. 1.

Fig. 19 is an exploded perspective view of the adjustable connection between the drive shaft and the gear carried thereby.

Fig. 20 is a fragmentary section in the line 20—20 of Fig. 17.

Fig. 21 is an enlarged section through the end of the crank shaft and propeller.

Fig. 22 is an exploded perspective view of the end of the crank shaft and the propeller supporting plate, and Fig. 23 is a fragmentary perspective view of the propeller attaching plate.

The crankcase 10 comprises a two-part housing, held together by suitable bolts 11. A plurality of cylinders 12 are mounted in the lower portion of the crankcase and extend downwardly. In the lower portion of the crank case housing there are provided supports 13 having V-shaped recesses 14. Bearing members 15 and 15a have V-shaped portions which seat in the recesses 14. These bearing members are clamped in the recesses by bolts 16 having enlarged portions 16a to provide a close dowel fit at the points where the bearing members and the supports meet. The crank shaft 17 is supported by the bearing members 15 and 15a through the medium of anti-friction members interposed between races formed on the bearing members and races provided on the crank shaft. The end bearing members 15 are formed with deep grooved raceways which receive the anti-friction balls 18 and the corresponding raceways on the crank shaft are of the deep groove type.

The bearing members 15a are provided with flat raceways and anti-friction rollers 19 are interposed between these raceways and grooves provided in the crank shaft. The inner race of the front bearing is a separate ring which is press fitted on the crank shaft. The inner race member for the rear bearing is the hub of a bevel gear 20 in which is provided a ball groove. The rear end of the crank shaft is provided with a series of grooves 21 into which project tongues 22 formed on the gear 20. It is thus possible for the end of the crank shaft to slide slightly in the gear 20. This arrangement, together with the provision of the flat outer raceways in the bearing members 15a permits any slight longitudinal movement that may be necessary to take care of the difference of longitudinal expansion between the crank case and the crank shaft, the front end of the crank shaft being held against longitudinal movement by the anti-friction balls of the bearing 15.

In the cylinders 12 are provided pistons 23 and connecting rods 24. The upper ends of the connecting rods are provided with raceways 25 in which are received the anti-friction rollers 26 which also run in raceways 27 provided in the crank shaft. The connecting rods are located in relation to the crank shaft by the engagement of the ends of the rollers 26 with the walls of the race grooves 25 and 27. A two-part cam shaft housing 28 is supported below the ends of the cylinders 12 and the upper portion thereof is provided with supports 29 having V-shaped recesses. The cam shaft 30 is mounted in bearing members 31 having V-shaped portions which seat in the recesses 29. Between the bearing members 31 and the cam shaft 30 are interposed anti-friction balls 32. Grooves are provided in the cam shaft for receiving the anti-friction balls and a groove is provided in the rear bearing outer race member, while, in the other bearing outer race members the raceways are flat. The rear bearing thus takes the thrust applied to the cam shaft and the other bearings permit longitudinal shifting of the cam shaft relative to the cam shaft housing. The bearing members 31 are clamped in the recesses in the supports 29 by means of bolts 33a which have enlarged portions 33b to provide a close dowel fit at the points where the bearing members meet the supports, thus insuring accurate location of the bearings in their seats. On the cam shaft are provided a series of cams 33 which engage rocker arms 34 to actuate the valve 35 in the well-known manner, the rocker arms being supported by the projections 36.

The cam shaft 30 is operated from the crank shaft 17 by means of a drive shaft 37. The drive shaft 37 is provided with bevel gear 38 meshing with the bevel gear 20 and with a bevel gear 39 meshing with a bevel gear 40, mounted on the rear end of the cam shaft. The hub of each gear 38 and 39 is provided with a deep groove raceway which receives the anti-friction balls 41, these balls also being received in grooves provided in race members 42 supported by the crank case and cam shaft housing. A housing 43 surrounds the shaft 37 and protects the same. The bevel gear 39 is attached to the drive shaft 37 by interengaging teeth formed on the shaft and gear. This way of mounting the gear on the shaft makes possible a very fine adjustment of the timing of the valves. In this particular instance, the teeth connecting the shaft and gear are 31 in number, while the gear teeth are 12 in number. The gear may be adjusted to 31 positions on the shaft and the gear teeth can be meshed with the teeth of the gear 40 in 12 different positions. Very fine variations in the timing of the cam shaft may thus be effected.

An oil pump 44 of the double gear type is secured to the upper part of the cam shaft housing and is provided with a drive gear 45 which meshes with the cam shaft gear 40. An intake pipe 46 for the pump 44 leads from the front part of the cam shaft housing and the pump is provided also with an inlet 47 communicating with the rear part of the housing. An outlet pipe 48 conducts oil from the pump to a pipe 49 extending into the crankcase and having ports which discharge the oil against the cylinder wall. Also an oil supply pipe 50 delivers oil to the gears 38 and 20, the oil being directed between the gears at the point of mesh. An oil return pipe 50a extends between the crankcase and the cam shaft housing near the front of the engine and oil is also returned through the housing 43 at the rear.

Gears 51 carried by shafts 52 mesh with the gear 40 and constitute the driving means for the magnetos. A universal link 53 connects the end of the cam shaft with the driving cable 54 for the tachometer.

A plate or collar 55 is attached to the front end of the crank shaft and provides means for supporting a propeller. The collar 55 is provided with a hub 56 having a tapering inner surface which fits over a sleeve 57 having a reversely tapered outside surface. The sleeve 57 has a press fit on the hub and snap ring 58 serves as a safety guard to prevent axial movement of the sleeve. In the outer end of the crank shaft are provided longitudinal grooves into which project tongues carried by the hub 56, thus keying the hub to the shaft. A nut 59 is threaded on the end of the crank shaft and bears against the end of the hub 56 to force the inner surface of the hub into clamping contact with the outer surface of the sleeve 57. The plate 55 is provided with a plurality of apertures in which are arranged interiorly threaded tubular members 60 which are held against longitudinal movement by the snap rings 61. Each member 60 is provided with a segmental head 62, the flat part of which engages a rib 63, thereby preventing rotation of the member 60. A cap 64 constitutes the propeller clamping member and is provided with apertures through which extend the clamping bolts 65. The propeller 66 is arranged between the plate 55 and the cap 64 and is provided with a central bore into which extends one end of the hub 56 and a collar 67 provided on the cap 64. The propeller also is provided with holes through which extend the bolts 65. The propeller is clamped in position by means of the bolts 65 which are screwed into the members 60. The heads of the bolts 65 are easily accessible from the front of the motor and as the members 60 are held against rotation it is a simple matter to attach or remove the propeller.

The cap 64, together with the hub of the propeller 66 are substantially stream line in contour and the front end of the crankcase is also made stream line. With a stream line cap and stream line propeller hub, the air resistance is materially decreased and this stream lining is done without extra cowling such as is used in prior art motors.

As shown in Fig. 1a, each cylinder 12 is provided with a head 12a which is threaded in place. The cylinder is composed of steel while the head is composed of aluminum. A tight seal is formed between the head and cylinder by the projection of a rib on the cylinder into a recess in the head.

The interior diameter of the threads on the cylinder is slightly less than that of the threads on the head, so that the latter is constantly under tension. In assembling, the cylinder is heated to expand it while the head is kept cool. The head will then easily screw into the cylinder.

It is, of course, understood that various modifications may be made without in any way departing from the spirit of the invention as defined in the appended claims.

I claim:

1. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members and supports for clamping the bearing members in place, a crank shaft journalled in said bearing members with its crank pins in alinement with said cylinders, anti-friction members interposed between said crank shaft and bearing members, pistons in said cylinders, and connecting rods between said pistons and crank pins.

2. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members, and supports for clamping the bearing members in place, a crank shaft journalled in said bearing members with its crank pins in alinement with said cylinders, co-operating ball grooves in one end of said crank shaft and in one of said bearing members, a collar slidably mounted on the other end of said crank shaft, co-operating ball grooves in said collar and another of said bearing members, anti-friction balls arranged in said grooves, anti-friction rollers interposed between the remaining bearing members and said crank shaft, one raceway for each set of anti-friction rollers being smooth to permit axial movement of said crank shaft in said bearings, pistons in said cylinders, and connecting rods between said pistons and crank pins.

3. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members and supports for clamping the bearing members in place, a crank shaft journalled in said bearing members with its crank pins in alinement with said cylinders, co-operating ball grooves in one end of said crank shaft and in one of said bearing members, a collar slidably mounted on the other end of said crank shaft, co-operating ball grooves in said collar and another of said bearing members, anti-friction balls arranged in said grooves, anti-friction rollers interposed between the remaining bearing members and said crank shaft, one raceway for each set of anti-friction rollers being smooth to permit axial movement of said crank shaft in said bearings, a shaft arranged at right angles to said crank shaft, a fixed bearing for said shaft, and inter-meshing bevel gears carried by said collar and said shaft.

4. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members and supports for clamping the bearing members in place, a crank shaft journalled in said bearing members with its crank pins in alinement with said cylinders, anti-friction members interposed between said crank shaft and bearing members, pistons in said cylinders, connecting rods between said pistons and crank pins, said connecting rods having integral loops in which are received the crank pins, and anti-friction members interposed between said crank pins and the inner surfaces of the connecting rod loops.

5. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members and supports for clamping the bearing members in place, a crank shaft journalled in said bearing members with its crank pins in alinement with said cylinders, co-operating ball grooves in one end of said crank shaft and in one of said bearing members, a collar slidably mounted on the other end of said crank shaft, co-operating ball grooves in said collar and another of said bearing members, anti-friction balls arranged in said grooves, anti-friction rollers interposed between the remaining bearing members and said crank shaft, one raceway for each set of anti-friction rollers being smooth to permit axial movement of said crank shaft in said bearings, pistons in said cylinders, connecting rods between said pistons and crank pins, said connecting rods having integral loops in which are received the crank pins, and anti-friction members interposed between said crank pins and the inner surface of the connecting rod loops.

6. In an internal combustion engine, a two-part crankcase, a plurality of cylinders extending from one part of the crankcase, supports extending from said part and having V-shaped recesses, integral bearing members having V-shaped portions seated in said recesses, bolts passing through said bearing members and supports for clamping the bearing members in place, a crank shaft journalled in said bearing members with its crank pins in alinement with said cylinders, co-operating ball grooves in one end of said crank shaft and in one of said bearing members, a collar slidably mounted on the other end of said crank shaft, co-operating ball grooves in said collar and another of said bearing members, anti-friction balls arranged in said grooves, anti-friction rollers interposed between the remaining bearing members and said crank shaft, one raceway for each set of anti-friction rollers being smooth to permit axial movement of said crank shaft in said bearings, pistons in said cylinders, connecting rods between said pistons and crank pins, said connecting rods having integral loops in which are received the crank pins, anti-friction members interposed between said crank pins and the inner surfaces of the connecting rod loops, a shaft arranged at right angles to said crank shaft, a fixed bearing for said shaft, and inter-meshing bevel gears carried by said collar and said shaft.

HUGH M. ROCKWELL.